United States Patent
Koenen

(10) Patent No.: US 12,476,501 B2
(45) Date of Patent: Nov. 18, 2025

(54) ROTOR AND ELECTRIC MACHINE OF AN ELECTRIC VEHICLE

(71) Applicant: Dr. Ing. h.c. F. Porsche Aktiengesellschaft, Stuttgart (DE)

(72) Inventor: Christian Koenen, Stuttgart (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 239 days.

(21) Appl. No.: 18/333,586

(22) Filed: Jun. 13, 2023

(65) Prior Publication Data
US 2023/0412021 A1 Dec. 21, 2023

(30) Foreign Application Priority Data
Jun. 21, 2022 (DE) ........... 10 2022 115 420.3

(51) Int. Cl.
H02K 1/27 (2022.01)
H02K 1/276 (2022.01)
H02K 1/28 (2006.01)

(52) U.S. Cl.
CPC .......... H02K 1/276 (2013.01); H02K 1/28 (2013.01)

(58) Field of Classification Search
CPC .......... H02K 1/276; H02K 1/28; H02K 15/03; H02K 1/2766; H02K 21/14
See application file for complete search history.

(56) References Cited

U.S. PATENT DOCUMENTS

| | | | |
|---|---|---|---|
| 2011/0156521 A1* | 6/2011 | Nagashima | H02K 1/2766 310/156.28 |
| 2015/0171717 A1* | 6/2015 | Wakade | H01F 1/0577 419/30 |
| 2018/0205276 A1 | 7/2018 | Tangudu et al. | |

FOREIGN PATENT DOCUMENTS

| | | |
|---|---|---|
| DE | 4033454 A1 | 4/1992 |
| DE | 102013211858 A1 | 12/2014 |
| DE | 102018210967 A1 | 1/2020 |
| DE | 102019117686 A1 | 1/2021 |
| DE | 102019127583 A1 * | 4/2021 |
| JP | H06017184 A | 1/1994 |
| JP | 2015070749 A | 4/2015 |
| JP | 2017143698 A * | 8/2017 |

* cited by examiner

*Primary Examiner* — Thomas Truong
(74) *Attorney, Agent, or Firm* — LEYDIG, VOIT & MAYER, LTD.

(57) ABSTRACT

A rotor of an electric machine of an electric vehicle includes a plurality of permanent magnets a rotor core, which includes a plurality of magnetic receptacle cavities, in each of which one permanent magnet is arranged. The permanent magnets are respectively connected to the rotor core via a spring-groove connection in a form-fit manner such that a displacement of the permanent magnets in a direction of an outer peripheral surface of the rotor core is blocked. The permanent magnets are each integrally manufactured by metal injection molding.

13 Claims, 3 Drawing Sheets

ROTOR AND ELECTRIC MACHINE OF AN ELECTRIC VEHICLE

CROSS REFERENCE TO RELATED APPLICATIONS

This application claims benefit to German Patent Application No. DE 10 2022 115 420.3, filed on Jun. 21, 2022 which is hereby incorporated by reference herein.

FIELD

The invention relates to a rotor of an electric machine of an electric vehicle. The invention further relates to an electric machine.

BACKGROUND

Permanently excited rotors are commonly used in electrical machines and cooperate with a stator, i.e., a magnetic field caused by the energizing of the stator. For this purpose, the rotor comprises a rotor core and a plurality of permanent magnets arranged adjacent one another in the peripheral direction. Each permanent magnet is arranged in a respective magnetic receptacle cavity such that the permanent magnets are embedded in the rotor core. Two adjacent magnetic receptacle cavities can also be connected to one another. The magnetic receptacle cavities and the permanent magnets typically each have a rectangular cross-section and thus a cuboid shape, wherein the permanent magnets are typically glued to the rotor core.

In order to obtain as high a efficiency as possible of the electric machine, the permanent magnets should be arranged as far outward radially as possible on the rotor core, i.e., as close as possible to the radial gap between the rotor and the stator. This can be achieved, for example, in that the magnetic receptacle cavities extend to an outer peripheral surface of the rotor core, such that the magnetic receptacle cavities are open at the outer peripheral surface of the rotor core and the permanent magnets embedded in the rotor core extend up to directly at the radial gap. The problem here is that, at high speeds of the rotor, the permanent magnets shift out of the respective pockets and into the radial gap due to the centrifugal force applied to them. This leads to failure and damage to the electrical machine. In addition, the rotor core and the permanent magnets heat up during operation, wherein the different thermal expansion coefficients of the rotor core and the permanent magnet increase the risk of the permanent magnets shifting in the direction of the radial gap.

In order to prevent such a displacement of the permanent magnets, a protrusion can be provided on a side surface of the magnetic receptacle cavities, wherein the permanent magnets radially abut the protrusions. In this way, the permanent magnets can be secured in a form-fit manner against displacement in the direction of the radial gap. However, this results in the permanent magnets having to be offset in the direction of the axis of rotation, i.e., away from the radial gap, in order to be able to form the protrusions. This causes a reduction in the efficiency of the electric machine. Such a configuration is disclosed in DE 10 2019 117 686 A1, for example.

In order to secure the permanent magnets in a form-fit manner against displacement in the direction of the radial gap on the one hand, and on the other hand to position the permanent magnets relatively close to the radial gap and thus to provide a high efficiency of the electric machine, the permanent magnets can be secured in a form-fit manner against a displacement in the direction of the radial gap between the rotor and the stator on the other hand via a spring-groove connection. DE 10 2018 210 967 A1 discloses such an embodiment. The permanent magnets have a semi-circular recess on a side surface of the magnetic receptacle cavity, into which a semi-circular protrusion provided on the side surface of the magnetic receptacle cavity engages.

The problem here is the elaborate manufacture of the permanent magnets with a recess for providing a spring-groove connection. The permanent magnets are produced by a sintering process, wherein a green part is produced by a pressing operation of a metal and the green part is subsequently sintered. Small, filigree geometries, i.e., the recess required for the spring-groove connection, cannot be produced in the sintering process. Thus, such recesses on the sintered permanent magnets must be mechanically manufactured in a subsequent separate step. In this case, the recesses can be made by milling, which is also an expensive and complex process, because the sintered permanent magnets are relatively brittle and thus the milling is complex and complicated. In addition, the recesses can be made by grinding, wherein the grinding is very time-consuming.

SUMMARY

In an embodiment, the present disclosure provides a rotor of an electric machine of an electric vehicle, comprising a plurality of permanent magnets a rotor core, which comprises a plurality of magnetic receptacle cavities, in each of which one permanent magnet is arranged. The permanent magnets are respectively connected to the rotor core via a spring-groove connection in a form-fit manner such that a displacement of the permanent magnets in a direction of an outer peripheral surface of the rotor core is blocked. The permanent magnets are each integrally manufactured by metal injection molding.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
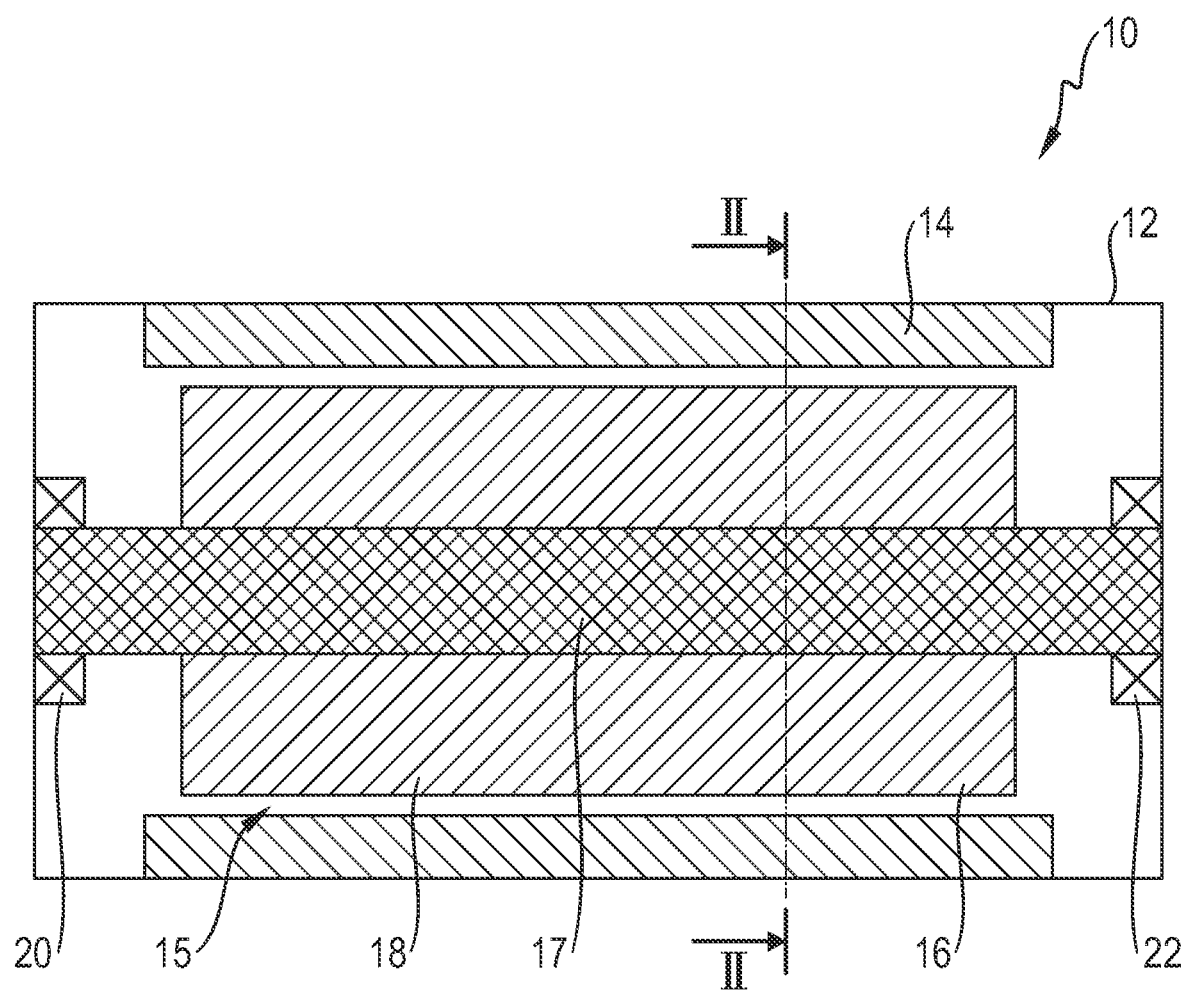
FIG. 1 schematically shows an electric machine of an electric vehicle in cross-section.

In an embodiment, the present invention provides a rotor for an electric machine having a plurality of permanent magnets embedded in the rotor core and reliably secured in a form-fit lock against displacement in the direction of the radial gap of the electric machine, wherein the permanent magnets can be produced simply and inexpensively and the electric machine has a high efficiency.

In an embodiment, the present invention provides a rotor of an electric machine of an electric vehicle having a plurality of permanent magnets, and a rotor core, which comprises a plurality of magnetic receptacle cavities, in each of which one permanent magnet is arranged, wherein the permanent magnets are respectively connected to the rotor core via a spring-groove connection in a form-fit manner such that a displacement of the permanent magnets in the direction of an outer peripheral surface of the rotor core is blocked.

Due to the fact that the permanent magnets are each integrally formed and made by metal injection molding, the permanent magnets can be manufactured inexpensively and in a time-saving manner despite an existing spring-groove connection between the permanent magnets and the rotor core. Through the metal injection molding, the permanent magnets can be produced in a simple and cost-efficient manner with any geometry, in particular with delicate geometries. In particular, protrusions and/or recesses can be made on the permanent magnets in the manufacturing process of the permanent magnets, i.e., in the sintering process. A subsequent manufacturing step, in particular a mechanical machining of the permanent magnets for the production of a protrusion or a recess, is omitted, wherein the manufacturing costs can be reduced.

In metal injection molding, metal powder is mixed with a binder, which is in particular made of a plastic, and a green part is produced with a desired shape by injection molding. Subsequently, the binder is removed again by a thermal debonding or a solvent release, wherein the shape of the green part is retained. This results in a so-called brown part. Finally, the brown part is fed to a furnace in which a sintering operation takes place and the final component, i.e., in the present case the permanent magnets, is produced. Thus, a sintered, metallic permanent magnet can be produced by the metal injection molding, taking advantage of the advantageous wide variety of shaping of the injection molding.

Preferably, the rotor core comprises a respective protrusion projecting into the magnetic receptacle cavities, wherein the protrusions engage into a respective recess of the permanent magnets arranged in the magnetic receptacle cavities. Alternatively, the permanent magnets each comprise a protrusion which engages into a respective recess formed on the rotor core, wherein a respective recess is arranged on a surface delimiting the respective magnetic receptacle cavity. A form-fit connection between the permanent magnet and the rotor core can be formed in a simple manner by the spring-groove connection formed by a protrusion and a recess.

In a preferred embodiment, the rotor core has a respective recess at two opposing side surfaces and the permanent magnets have a respective protrusion at two subtended sides, or the rotor core has a respective protrusion at two opposing side surfaces and the permanent magnets have a respective recess at two subtended sides. The displacement of the permanent magnets into the radial gap can thus be particularly reliably avoided.

Preferably, the protrusion and the recess have a rectangular cross-section. Alternatively, the protrusion and the recess have a triangular cross-section. In both embodiments, the side of the protrusions and the recesses facing away from the outer peripheral surface of the rotor core is aligned perpendicular to the abutment surface between the permanent magnets and the rotor core. This can prevent the permanent magnets from shifting in the direction of the radial gap between the rotor and the stator, i.e., in the direction of the outer peripheral surface of the rotor core, even when the magnetic receptacle cavities are slightly widened due to thermal expansions and mechanical stresses due to centrifugal forces.

Preferably, the magnetic receptacle cavities are open at an outer peripheral surface of the rotor core. As a result, the permanent magnets can be placed relatively close to the radial gap between the rotor and the stator, thereby increasing the efficiency of the electric machine.

Preferably, a brace is arranged on the outer peripheral surface of the rotor core, which can increase speed strength.

In a preferred embodiment, a plurality of surface permanent magnets are arranged on the outer peripheral surface of the rotor core, wherein, between a respective surface permanent magnet and two permanent magnets arranged in a V-shape, an intermediate element is arranged, which abuts the surface permanent magnet with a first side and abuts the permanent magnets with a second side subtended relative to the first side. Thus, the assembly of the permanent magnets and the surface permanent magnets on the rotor can be simplified, wherein first the permanent magnets are mounted, then the intermediate element and the surface permanent magnets, and finally the brace is mounted. Such an assembly allows the spring-groove connections between the permanent magnets and the rotor core to be easily and reliably manufactured.

The problem is solved by an electric machine having a stator and a rotor according to embodiments of the present invention. With respect to the advantages of the electric machine, reference is made to the preceding paragraphs.

Two exemplary embodiments of the invention are explained in further detail with reference to the drawings.

FIG. 1 shows an electric machine 10, which is used, for example, as a traction machine of an electric vehicle. The electric machine 10 comprises a housing 12, which delimits a housing interior. A stator 14 and a rotor 16 are arranged in the housing 12, i.e., in the housing interior. The stator 14 is fixed to the housing 12, i.e., to a housing wall, via the outer peripheral surface and is thus rigidly arranged in the housing 12. An inner peripheral surface of the stator 14 delimits a through-opening in which the rotor 16 is arranged, wherein the inner peripheral surface of the stator 14 and the outer peripheral surface of the rotor 16 delimit a radial gap 15. The rotor 16 comprises a rotor shaft 17 and a rotor core 18, wherein the rotor core is in particular embodied as a rotor sheet package. The rotor shaft 17 is rotatably supported on the housing 12, wherein a bearing element 20, 22 is arranged on both axial ends of the rotor shaft 17. The rotor core 18 is attached to a peripheral surface of the rotor shaft 17 and rotates along with the rotor shaft 17. The electric machine 10 is embodied as a permanently excited electric machine.

Figure 2:
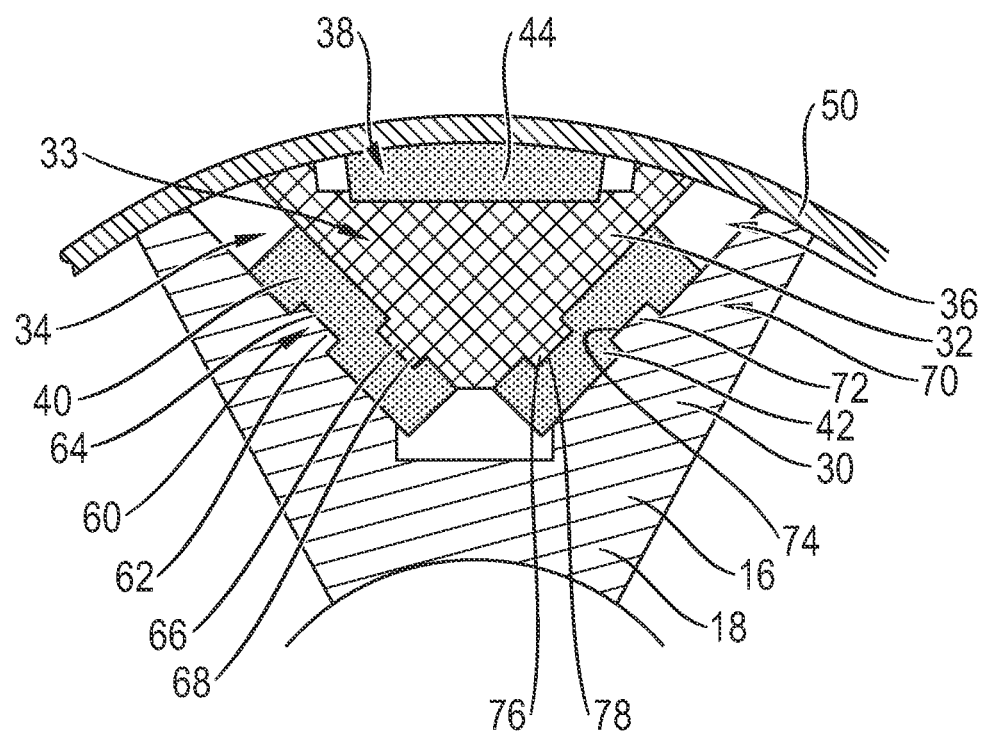
FIG. 2 shows a first embodiment of a rotor of the electric machine of FIG. 1.
Figure 3:
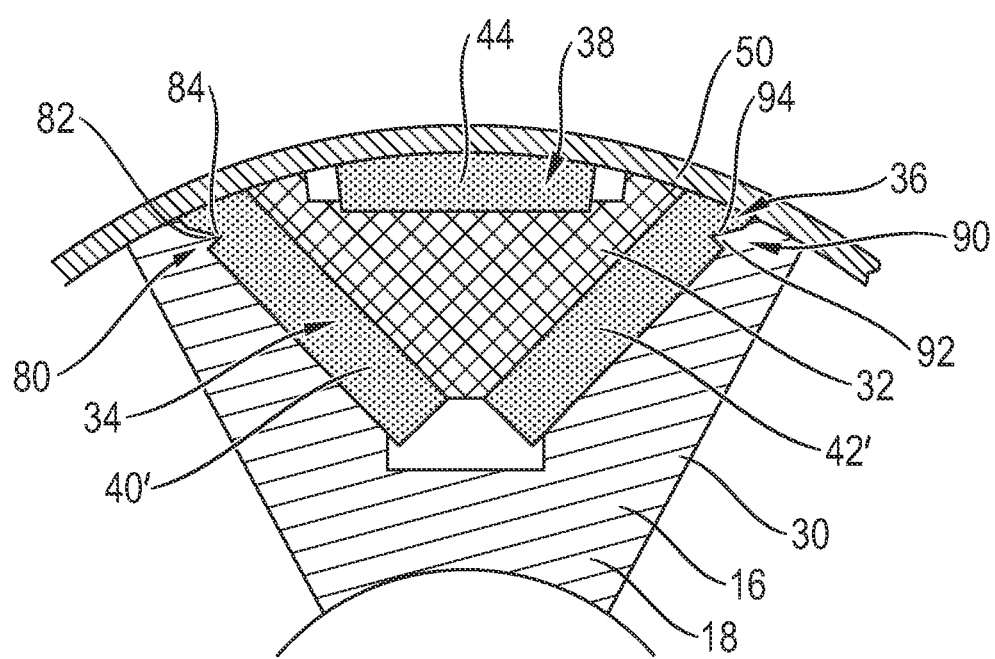
FIG. 3 shows a second embodiment of a rotor of the electric machine of FIG. 1.

FIGS. 2 and 3 show an excerpt of the rotor 16, respectively. The excerpts shown in FIGS. 2 and 3 are arranged throughout the entire periphery, wherein the excerpts are identical.

FIG. 2 shows a first embodiment of the rotor 16. The rotor 16 comprises the rotor core 18, multiple permanent magnets 40, 42, multiple surface permanent magnets 44, and a brace 50. The rotor core 18 is composed of a base body 30 as well as a plurality of intermediate elements 32, wherein the intermediate elements 32 are arranged in a respective recess 33 of the base body 30. Both the base body 30 and the intermediate elements 32 are in particular formed by a plurality of stacked sheets. The intermediate elements 32 are designed smaller than the corresponding recesses 33, such that the respective surfaces facing an intermediate element 32 of the recesses 33 of the base body 30 and the surfaces of the respective intermediate element 32 facing the base body 30 delimit two magnetic receptacle cavities 34, 36. Here, the surfaces of the recess 33 and the intermediate element 32 which delimit the magnetic receptacle cavities 34, 36 run parallel to each other, wherein the recesses 33 and the intermediate elements 32 are arranged such that the two magnetic receptacle cavities 34, 36 form a V-shape. The two magnetic receptacle cavities 34, 36 are open on the side facing the outer peripheral surface of the rotor core 18.

One permanent magnet 40, 42 is respectively arranged in each of the two magnetic receptacle cavities 34, 36, having a rectangular cross-section and, in the final mounted state, abutting the intermediate element 32 with a respective side surface and abutting the base body 30 with an opposite side surface. With the previously discussed design of the magnetic receptacle cavities 34, 36, the two permanent magnets 40, 42 are arranged in a V-shape.

The surface permanent magnets 44 are arranged on a side facing away from the base body 30 of the intermediate elements 32, wherein the intermediate elements 32 for receiving the surface permanent magnets 44 each have a groove-like recess 38.

When the rotor core 18 is assembled, the embedded permanent magnets 40, 42 are first inserted into the recesses 33 of the base body 30, then the intermediate elements 32 are inserted into the recesses 33 with the already pre-assembled surface permanent magnets 44. Finally, the brace 50 is mounted, wherein the permanent magnets 40, 42 are pressed to the base body 30 via the brace 50 via the surface permanent magnets 44 and the intermediate elements 32. Thus, the final attachment of the permanent magnets 40, 42, the intermediate elements 32, and the surface permanent magnets 44 is accomplished by the brace 50.

Particularly at high speeds of the rotor 16, relatively high centrifugal forces act on the permanent magnets 40, 42, thereby risking that the permanent magnets 40, 42 will shift in the direction of the outer peripheral surface of the rotor core 18 or into the radial gap 15, respectively, between the rotor 16 and the stator 14. In addition, the rotor 16 also heats up in operation and, if necessary, expands the magnetic receptacle cavities 34, 36 due to the thermal expansions of the rotor 16 that are caused by them and which deviate from one another, thereby affixing the permanent magnets 40, 42 along the surfaces of the intermediate element 32 and the base body 30. In order to prevent such a displacement of the permanent magnets 40, 42, a spring-groove connection 60, 70 is provided for each magnetic receptacle cavity 34, 36. Each spring-groove connection 60, 70 comprises two protrusions 62, 66, 72, 76, each of which has a protrusion 62, 72 formed on a surface of the base body 30 delimiting the recess 33, and a protrusion 66, 76 on which surfaces of the intermediate element 32 delimiting the magnetic receptacle cavities 34, 36 are formed. Thus, all protrusions 62, 66, 72, 76 are provided on the rotor core 18. The protrusions 62, 66, 72, 76 each engage into a recess 64, 68, 74, 78 formed on the permanent magnets 40, 42. The recesses 64, 68, 74, 78 and protrusions 62, 66, 72, 76 each have a rectangular cross-section. Alternatively, the protrusions can also be provided on the permanent magnets 40, 42 and the recesses can be provided on the rotor core 18. The permanent magnets 40, 42 are thereby secured in a form-fit manner along the surfaces of the intermediate element 32 and the base body 30 which delimit the magnetic receptacle cavities 34, 36.

In order to provide permanent magnets 40, 42 with such recesses 64, 68, 74, 78 or in an alternative design with protrusions, permanent magnets 40, 42 are produced by metal injection molding. In metal injection molding, metal is mixed with a plastic binder and a green part is mixed with a desired shape, i.e., in the present case with a rectangular cross-section and the recesses or protrusions made by injection molding. The plastic binder is then removed again by a thermal debonding or a solvent release, wherein the shape of the green part is retained. This results in a so-called brown part. Finally, the brown part is fed to a furnace in which a sintering operation takes place and the final component, i.e., in the present case the permanent magnets with the recesses and/or protrusions, is produced.

As a result, the integral permanent magnets 40, 42 can be manufactured having the recesses 64, 68, 74, 78 in a simple and cost-effective manner.

FIG. 3 shows a second embodiment of the rotor 16. The key differences between the second embodiment and the first embodiment of FIG. 2 are that there is only a single protrusion 82, 92 and a single recess 84, 94 per magnetic receptacle cavity 34, 36 and per spring-groove connection 80, 90, respectively, the protrusions 82, 92 and the recesses 84, 94 have a triangular cross-section and the permanent magnets 40', 42' extend up to the open side of the magnet receptacle cavities 34, 36 facing the radial gap 15.

Thus, a rotor for an electric machine is provided, wherein the permanent magnets can be manufactured inexpensively and in a time-saving manner despite an existing spring-groove connection between the permanent magnets and the rotor core, and the electric machine can be made with a high efficiency.

Structural embodiments other than the described embodiments, which fall within the scope of embodiments of the present invention, are possible as well. For example, the permanent magnets can have a different shape and/or the rotor core can be different.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rotor of an electric machine of an electric vehicle, comprising:
   a plurality of permanent magnets; and
   a rotor core, which comprises a plurality of magnetic receptacle cavities, in each of which one permanent magnet is arranged, wherein the permanent magnets are respectively connected to the rotor core via a spring-groove connection in a form-fit manner such that a displacement of the permanent magnets in a direction of an outer peripheral surface of the rotor core is blocked, wherein the permanent magnets are each integrally manufactured by metal injection molding, wherein, between a respective surface permanent magnet of a plurality of surface permanent magnets and two permanent magnets arranged in a V-shape, an intermediate element is arranged, which abuts the respective surface permanent magnet with a first side and abuts the permanent magnets with a second side subtended relative to the first side, and wherein the second side of the intermediate element is formed on a protrusion of the spring-groove connection.

2. The rotor according to claim 1, wherein the rotor core comprises a respective protrusion protruding into the magnetic receptacle cavities, and wherein the protrusions are respectively engaged into a recess of the permanent magnets arranged in the magnetic receptacle cavities.

3. The rotor according to claim 2, wherein the rotor core has a respective recess at two opposing side surfaces and the permanent magnets have a respective protrusion at two subtended sides, or the rotor core has a respective protrusion at two opposing side surfaces and the permanent magnets have a respective recess at two subtended sides.

4. The rotor according to claim 2, wherein the protrusions and the recesses have a rectangular cross-section.

5. The rotor according to claim 2, wherein the protrusions and the recesses have a triangular cross-section.

6. The rotor according to claim 1, wherein the permanent magnets each have a protrusion that engages with a respective recess formed on the rotor core, and wherein the respective recesses are arranged on a surface delimiting a respective magnetic receptacle cavity of the magnetic receptacle cavities.

7. The rotor according to claim 1, wherein the magnetic receptacle cavities are open on a side facing the outer peripheral surface of the rotor core.

8. The rotor according to claim 1, wherein a brace is arranged on the outer peripheral surface of the rotor core.

9. The rotor according to claim 1, wherein the plurality of surface permanent magnets are arranged on the outer peripheral surface of the rotor core.

10. An electric machine comprising: a stator and the rotor according to claim 1.

11. The rotor according to claim 1, further comprising a base body, wherein the intermediate element is arranged in a recess of the base body, wherein the intermediate element is designed smaller than the recess of the base body.

12. The rotor according to claim 11, wherein the respective surface permanent magnet is arranged on a side facing away from the base body and the intermediate elements.

13. The rotor according to claim 11, wherein the intermediate element and the base body are composed of a plurality of stacked sheets.

* * * * *